No. 838,248. PATENTED DEC. 11, 1906.
J. H. FULTON.
VENTILATOR.
APPLICATION FILED JAN. 22, 1906.
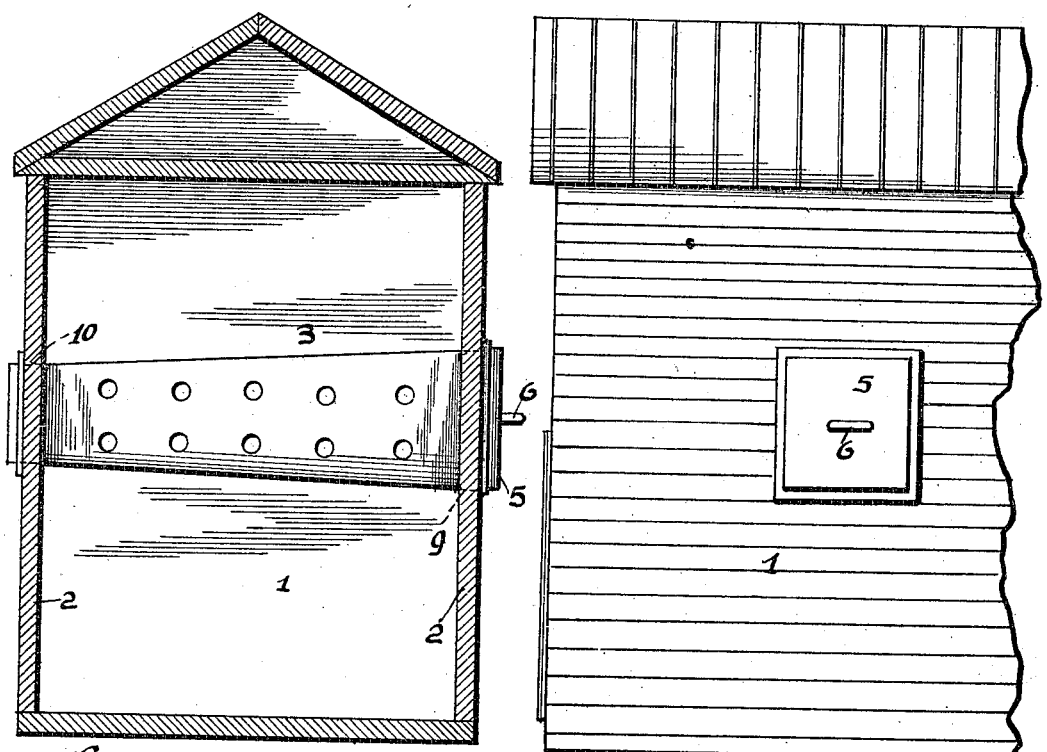
Fig. 1.  Fig. 2.
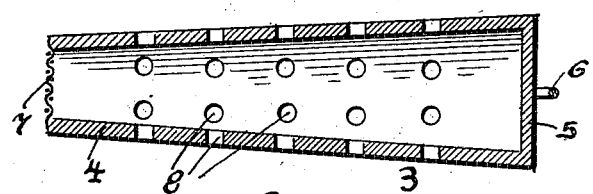
Fig. 3.
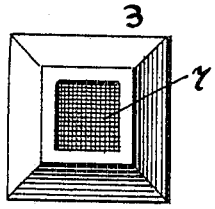
Fig. 4.
Fig. 5.
Witnesses:
C. Klostermann
N. H. Butler
Inventor.
James H. Fulton.
by N. C. Everett Co.
Attorneys.

UNITED STATES PATENT OFFICE.

JAMES H. FULTON, OF HANLIN STATION, PENNSYLVANIA.

VENTILATOR.

No. 838,248.　　　　Specification of Letters Patent.　　　Patented Dec. 11, 1906.

Application filed January 22, 1906. Serial No. 297,335.

To all whom it may concern:

Be it known that I, JAMES H. FULTON, a citizen of the United States of America, residing at Hanlin Station, in the county of Washington and State of Pennsylvania, have invented certain new and useful Improvements in Ventilators, of which the following is a specification, reference being had therein to the accompanying drawings.

This invention relates to certain new and useful improvements in ventilators; and the invention relates more particularly to a ventilator for corn-cribs, grain-bins, and the like storage structures where various kinds of grain and cereals are stored.

The primary object of my invention is to provide a novel form of ventilator for storage structures which will prevent the contents of the structure from molding and becoming heated or injured from close confinement and poor ventilation.

To this end my invention is particularly adapted for corn-cribs where in order to properly preserve the grain while in storage it is necessary that the same be thoroughly aerated to prevent the corn from becoming moldy and infected by insects, which thrive in a poorly-ventilated compartment.

In constructing my improved ventilator I have embodied certain novel features of construction which permit of the ventilator being easily and quickly removed at any desired time and cleansed, also permitting of its removal when the corn is to be removed from the crib.

With the above and other objects in view, which will more readily appear as the nature of the invention is better understood, the same consists in the novel construction, combination, and arrangement of parts to be hereinafter more fully described and claimed, and, referring to the drawings accompanying this application, like numerals of reference designating corresponding parts throughout the several views, in which—

Figure 1 is a sectional view of a corn-crib equipped with my improved ventilator. Fig. 2 is a side elevation of a portion of a corn-crib. Fig. 3 is a longitudinal sectional view of my improved ventilator. Fig. 4 is an end view of the same. Fig. 5 is a fragmentary sectional view of a portion of the ventilator, illustrating a slightly-modified form of construction.

In the accompanying drawings I have illustrated a conventional form of corn-crib 1, comprising principally side walls 2 2, between which my improved ventilator 3 is mounted.

The ventilator in its entirety comprises a tapering rectangular casing 4, preferably constructed of wood. The larger end of the casing 4 is closed by an end plate 5, which is provided with an eyelet or hook 6, the object of which will be presently described. The smaller or tapering end of the casing is provided with a screen 7, preferably formed of wire-mesh, through which air may pass into the casing 4. The sides of the casing are provided with a plurality of apertures or openings 8 to permit of the air entering the casing 4 passing into the compartment of the corn-crib 1. One of the side walls 2 of the corn-crib is provided with a large rectangular opening 9, through which the ventilator 3 passes, the smaller end of the ventilator engaging in a rectangular opening 10, formed in the opposite side wall 2.

The ventilator is firmly supported by the side walls 2 2 of the corn-crib and may be wedged between the side walls to firmly remain in proper position relative to the crib; but when it is desired to remove the same the eyelet or hook 6 is gripped and the ventilator in its entirety pulled outwardly from the one side wall 2 of the corn-crib.

In the present illustration I have only shown one ventilator as being used in connection with a medium-sized corn-crib; but I desire it to be understood that when the corn-cribs are large structures a plurality of the ventilators may be positioned transversely of the crib, whereby the entire contents of the crib will be thoroughly ventilated. In some instances where the ventilators are of a large size and have become wedged within the side walls of the crib by the settling of the side walls or the shrinkage of the material thereof a team of horses may be readily hitched to the hook or eyelet 6 and the ventilator easily and quickly withdrawn from the corn-crib.

Where the ventilator is used in connection with grain-bins and such storage structures where the cereals are very small, the openings 8 of the ventilator may be covered with a screen, whereby the grain or cereals cannot enter the ventilator, this detail construction being shown in Fig. 5 of the drawings.

The employment of the ventilator of the type described in connection with corn-cribs insures a perfect preserving of the cereal and prevents the same from becoming infected by insects from being closely confined.

The ventilator is also applicable to haymows to prevent spontaneous combustion and the hay from becoming moldy, thereby insuring a perfect ventilation of the building, such as a barn, in which a haymow is located.

I do not care to confine myself to any particular size or proportion in connection with the ventilator, and such changes as are permissible by the appended claim may be resorted to without departing from the spirit and scope of the invention.

What I claim, and desire to secure by Letters Patent, is—

The combination with the side walls of a building having openings, of a ventilator comprising a tapering casing provided with a plurality of openings, and adapted to fit within the openings in the said walls of the building, and having each of its ends projecting on the outside of said walls, the smaller end of said ventilator being provided with a screen, and the larger end of said ventilator being provided with a hook, substantially as described.

In testimony whereof I affix my signature in the presence of two witnesses.

JAMES H. FULTON.

Witnesses:
FRANK M. BARBER,
HARRY G. NOAH.